(12) United States Patent
Kim et al.

(10) Patent No.: US 10,473,985 B2
(45) Date of Patent: Nov. 12, 2019

(54) DISPLAY APPARATUS AND METHOD OF MANUFACTURING THE SAME

(71) Applicant: Samsung Display Co., Ltd., Yongin-si, Gyeonggi-Do (KR)

(72) Inventors: Hyoung-Joon Kim, Cheonan-si (KR); Sijin Kim, Hwaseong-si (KR); Hyangyul Kim, Hwaseong-si (KR); Matthew Smith, Seoul (KR); Jae Hoon Jung, Seoul (KR); Moon-Keun Choi, Hwaseong-si (KR); Seungjoo Choi, Incheon (KR)

(73) Assignee: Samsung Display Co., Ltd. (KR)

( * ) Notice: Subject to any disclaimer, the term of this patent is extended or adjusted under 35 U.S.C. 154(b) by 76 days.

(21) Appl. No.: 15/417,691

(22) Filed: Jan. 27, 2017

(65) Prior Publication Data

US 2018/0031889 A1    Feb. 1, 2018

(30) Foreign Application Priority Data

Jul. 27, 2016   (KR) ........................ 10-2016-0095710

(51) Int. Cl.
     *G02F 1/1339*      (2006.01)
     *G02F 1/1335*      (2006.01)
     *G02F 1/1333*      (2006.01)

(52) U.S. Cl.
     CPC ........ *G02F 1/13394* (2013.01); *G02F 1/1339* (2013.01); *G02F 1/133514* (2013.01); *G02F 1/133516* (2013.01); *G02F 2001/13398* (2013.01); *G02F 2001/133388* (2013.01); *G02F 2001/133519* (2013.01)

(58) Field of Classification Search
None
See application file for complete search history.

(56) References Cited

U.S. PATENT DOCUMENTS

| 6,914,658 B2 | 7/2005 | Seshan et al. |
| 2008/0018835 A1 | 1/2008 | Li et al. |
| 2009/0190054 A1 | 7/2009 | Kim et al. |
| 2013/0027645 A1 | 1/2013 | Yamakawa et al. |

(Continued)

FOREIGN PATENT DOCUMENTS

| KR | 10-2004-0107937 A | 12/2004 |
| KR | 10-2014-0101219 A | 8/2014 |

OTHER PUBLICATIONS

European Search Report, EP17178967, dated Jan. 10, 2018, 7 pages.

*Primary Examiner* — Phu Vu
(74) *Attorney, Agent, or Firm* — Innovation Counsel LLP

(57) ABSTRACT

A display apparatus includes a first substrate, a color filter, a gap maintaining pattern, a column spacer, and a blocking dam. The first substrate includes a display area and a peripheral area surrounding the display area. The color filter is disposed in the display area. The gap maintaining pattern is disposed in the peripheral area in a same layer as the color filter. The column spacer is disposed on the color filter. The blocking dam is disposed in a same layer as the column spacer and overlaps the gap maintaining pattern. The difference between the gap of the first and second substrates in the display area and the gap of the first and second substrates in the peripheral area may be decreased.

12 Claims, 13 Drawing Sheets

(56) References Cited

U.S. PATENT DOCUMENTS

2015/0131025 A1* 5/2015 Ota .................. G02F 1/133512
 349/58
2016/0041413 A1* 2/2016 Nishino ................ G02F 1/1339
 349/42

* cited by examiner

DISPLAY APPARATUS AND METHOD OF MANUFACTURING THE SAME

PRIORITY STATEMENT

This application claims priority under 35 U.S.C. § 119 to Korean Patent Application No. 10-2016-0095710, filed on Jul. 27, 2016 in the Korean Intellectual Property Office KIPO, the disclosure of which is herein incorporated by reference in its entirety.

BACKGROUND

1. Field

Exemplary embodiments of the present disclosure relate to a display apparatus and a method of manufacturing the display apparatus. More particularly, exemplary embodiments of the present disclosure relate to a display apparatus for reducing a stain at an edge portion of a display panel and decreasing a manufacturing cost and a method of manufacturing the display apparatus.

2. Description of the Related Art

As information technology advances, a demand for various display apparatuses has been increased. Accordingly, various types of display apparatuses including a liquid crystal display ("LCD") apparatus, a plasma display panel ("PDP"), a field emission display ("FED") apparatus, an electrophoretic display ("EPD") apparatus, an organic light emitting display ("OLED") apparatus have been actively studied.

The liquid crystal display apparatus includes a display substrate (e.g., thin film transistor substrate), a counter substrate facing the display substrate, and a liquid crystal layer disposed between the display substrate and the counter substrate. A plurality of gate lines, a plurality of data lines, a plurality of switching elements connected to the gate lines and the data lines, a plurality of pixel electrodes connected to the switching elements are formed on the display substrate. The switching element includes a gate electrode extended from the gate line, source electrode extended from the data line and connected to the gate electrode through a semiconductor pattern, and a drain electrode spaced apart from the source electrode and connected to the semiconductor pattern.

The display substrate and the counter substrate are combined with each other by a sealant that is formed at a peripheral portion of the display substrate. However, in a process of attaching the display substrate and the counter substrate, the thickness of the sealant may not be uniform so that a stain that may be formed due to a nonuniform gap between the display substrate and the counter substrate may be visible to a user.

SUMMARY

Exemplary embodiments of the present disclosure provide a display apparatus for reducing a defect.

Exemplary embodiments of the present disclosure also provide a method of manufacturing the above-mentioned display apparatus.

In an exemplary embodiment of a display apparatus according to the present disclosure, the display apparatus includes a first substrate, a color filter, a gap maintaining pattern, a column spacer, and a blocking dam. The first substrate includes a display area and a peripheral area surrounding the display area. The color filter is disposed in the display area. The gap maintaining pattern is disposed in the peripheral area in a same layer as the color filter. The column spacer is disposed on the color filter. The blocking dam is disposed in a same layer as the column spacer and overlaps the gap maintaining pattern.

In an exemplary embodiment, the blocking dam may include a first blocking dam and a second blocking dam adjacent to the first blocking dam and extending in a direction parallel to the first blocking dam.

In an exemplary embodiment, the display apparatus may further include a sealing member disposed between the first blocking dam and the second blocking dam.

In an exemplary embodiment, a distance between the first blocking dam and the second blocking dam may be equal to or greater than about 2.5 mm and equal to or less than about 3.5 mm.

In an exemplary embodiment, the color filter may include a first color filter including a red material, a second color filter adjacent to the first color filter and including a green material and a third color filter adjacent to the second color filter and including a blue material.

In an exemplary embodiment, the gap maintaining pattern may include a material substantially the same as the material of the first color filter.

In an exemplary embodiment, a height of the gap maintaining pattern may be equal to or greater than about 1.5 um and equal to or less than about 1.8 um.

In an exemplary embodiment, the gap maintaining pattern may include a material substantially the same as the material of the second color filter.

In an exemplary embodiment, a height of the gap maintaining pattern may be equal to or greater than about 1.5 um and equal to or less than about 1.8 um.

In an exemplary embodiment, the gap maintaining pattern may include a material substantially the same as the material of the third color filter.

In an exemplary embodiment, a height of the gap maintaining pattern may be equal to or greater than about 1.7 um and equal to or less than about 2.3 um.

In an exemplary embodiment, the display apparatus may further include a second substrate facing the first substrate and a liquid crystal layer disposed between the first substrate and the second substrate.

In an exemplary embodiment, the display apparatus may further include a gate electrode disposed on the second substrate, a source electrode overlapping the gate electrode, a drain electrode overlapping the gate electrode and spaced apart from the source electrode and a pixel electrode electrically connected to the drain electrode.

In an exemplary embodiment, the display apparatus may further include an overcoating layer disposed between the color filter and the column spacer.

In an exemplary embodiment of a method of manufacturing a display apparatus according to the present disclosure, the method includes forming a color filter and a gap maintaining pattern on a first substrate; and forming a column spacer overlapping the color filter and a blocking dam overlapping the gap maintaining pattern. The color filter may be formed in a display area of the display apparatus, and the gap maintaining pattern may be formed in a peripheral area of the display apparatus.

In an exemplary embodiment, the blocking dam may include a first blocking dam and a second blocking dam adjacent to the first blocking dam and extending in a direction parallel to the first blocking dam.

In an exemplary embodiment, the method may further include forming a sealing member between the first blocking dam and the second blocking dam.

In an exemplary embodiment, a distance between the first blocking dam and the second blocking dam may be equal to or greater than about 2.5 mm and equal to or less than about 3.5 mm.

In an exemplary embodiment, the forming the color filter may include forming a first color filter including a red material, forming a second color filter adjacent to the first color filter and including a green material and forming a third color filter adjacent to the second color filter and including a blue material.

In an exemplary embodiment, the gap maintaining pattern may include a material substantially the same as the material of the first color filter.

In an exemplary embodiment, a height of the gap maintaining pattern may be equal to or greater than about 1.5 um and equal to or less than about 1.8 um.

In an exemplary embodiment, the gap maintaining pattern may include a material substantially the same as the material of the second color filter.

In an exemplary embodiment, a height of the gap maintaining pattern may be equal to or greater than about 1.5 um and equal to or less than about 1.8 um.

In an exemplary embodiment, the gap maintaining pattern may include a material substantially the same as the material of the third color filter.

In an exemplary embodiment, a height of the gap maintaining pattern may be equal to or greater than about 1.7 um and equal to or less than about 2.3 um.

In an exemplary embodiment, the method may further include forming a thin film transistor on a second substrate facing the first substrate and forming a liquid crystal layer between the first substrate and the second substrate.

In an exemplary embodiment, forming the thin film transistor may include forming a gate electrode on the second substrate, forming a source electrode and a drain electrode on the gate electrode and forming a pixel electrode electrically connected to the drain electrode.

In an exemplary embodiment, the method may further include forming an overcoating layer between the color filter and the column spacer.

According to the display apparatus and the method of manufacturing the display apparatus of the present disclosure, the display apparatus includes the first blocking dam and the second blocking dam, and the sealing member is disposed between the first blocking dam and the second blocking dam. The sealing member is disposed between the first blocking dam and the second blocking dam so that a width of the sealing member may be uniformly formed. The difference between the gap of the substrates in the display area and the gap of the substrates in the peripheral area may be decreased. A stain that may be formed due to the difference between the gap of the substrates in the display area and the gap of the substrates in the peripheral area may be reduced.

In addition, the blocking dam is formed in a uniform height so that a seal spacer may be omitted. Thus, the manufacturing cost of the display apparatus may be decreased.

In addition, the display apparatus includes a gap maintaining pattern overlapping the first blocking dam and the second blocking dam. The gap maintaining pattern supports the area where the first blocking dam and the second blocking dam are formed so that the gap of the substrates may be uniformly formed in the display area and the peripheral area.

BRIEF DESCRIPTION OF THE DRAWINGS

The above and other features and advantages of the present disclosure will become more apparent by describing in detailed exemplary embodiments thereof with reference to the accompanying drawings, in which.

DETAILED DESCRIPTION

Hereinafter, the present disclosure will be explained in detail with reference to the accompanying drawings.

Figure 1:
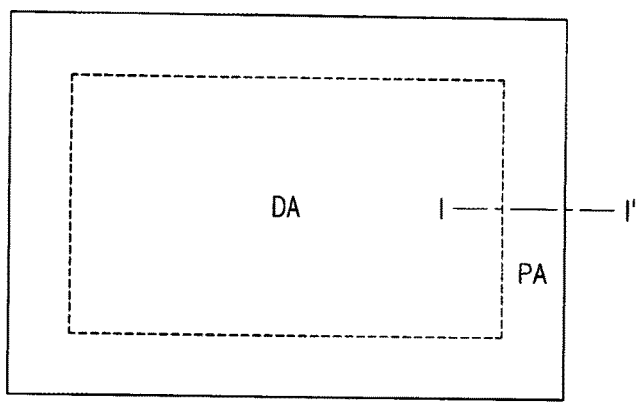
FIG. 1 is a plan view illustrating a display apparatus according to an exemplary embodiment of the present disclosure.
Figure 2:
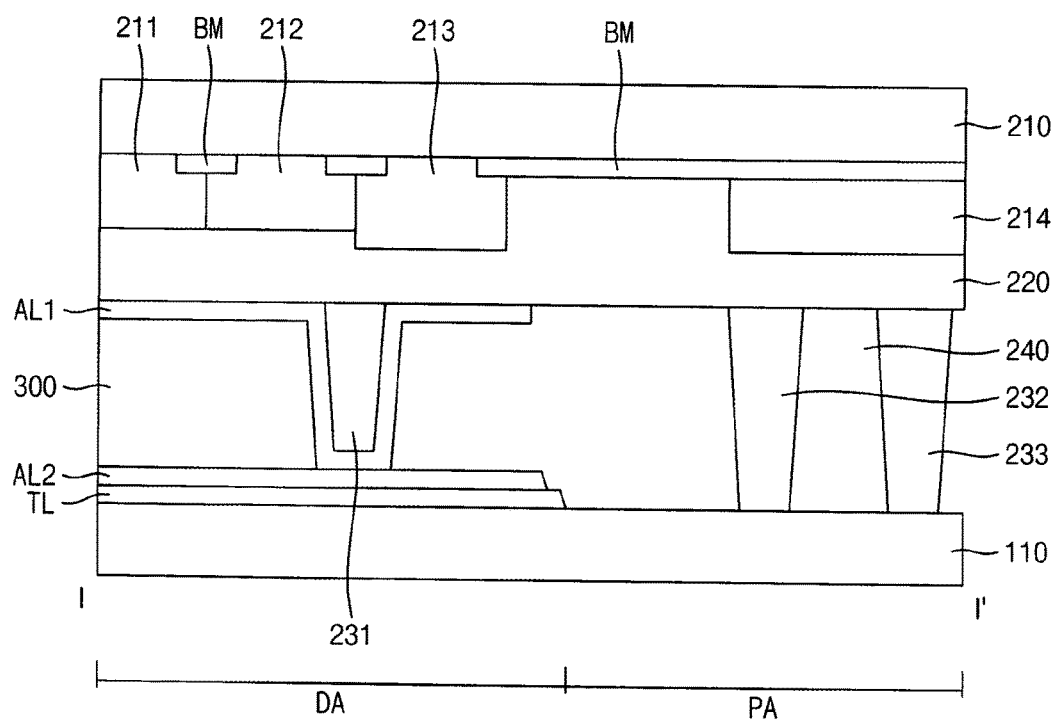
FIG. 2 is a cross-sectional view illustrating the display apparatus of FIG. 1 cut along a line I-I'.

FIG. 1 is a plan view illustrating a display apparatus according to an exemplary embodiment of the present disclosure. FIG. 2 is a cross-sectional view illustrating the display apparatus of FIG. 1 cut along a line I-I'.

Referring to FIGS. 1 and 2, the display apparatus 10 includes a display area DA and a peripheral area PA adjacent to the display area DA. The peripheral area PA may surround the display area DA. The display area DA may have a similar shape of the display apparatus 10. For example, the display area DA may have a rectangular shape.

The display apparatus 10 includes a first substrate 210, a second substrate 110 facing the first substrate 210, and a liquid crystal layer 300 disposed between the first substrate 210 and the second substrate 110.

A light blocking pattern BM is disposed on the first substrate 210. The light blocking pattern BM may be disposed between color filters of the display area DA and in the peripheral area PA. The light blocking pattern BM may block light.

The color filter is disposed on the first substrate 210 on which the light blocking pattern BM is formed. The color filter provides color to the light passed through the liquid crystal layer 300. The color filter may include a first color filter 211, a second color filter 212 and a third color filter 213. The first color filter 211 may be a red color filter including a red material. The second color filter 212 may be a green color filter including a green material. The third color filter 213 may be a blue color filter including a blue material. The color filters 211, 212, and 213 may be disposed corresponding to respective pixel areas such that the adjacent pixels represent colors that are different from each other. For example, a portion of the color filter may be overlapped by the adjacent color filter at a boundary between the pixel areas. The color filters 211, 212, and 213 are disposed in the display area DA.

A gap maintaining pattern 214 is disposed in the peripheral area PA of the display apparatus 10. In the present exemplary embodiment, the gap maintaining pattern 214 may include a material substantially the same as a material of the third color filter 213. The gap maintaining pattern 214 may be formed in a process of forming the third color filter 213. The gap maintaining pattern 214 may have a height substantially the same as a height of the third color filter 213. For example, the height of the third color filter 213 may be equal to or greater than about 1.7 um and equal to or less than about 2.3 um. The height of the gap maintaining pattern 214 may be equal to or greater than about 1.7 um and equal to or less than about 2.3 um.

An overcoating layer 220 is formed on the color filters 211, 212, and 213 and the gap maintaining pattern 214. The overcoating layer 220 planarizes the first substrate 210 to minimize the difference of the thickness of the first substrate 210. In addition, the overcoating layer 220 may prevent the liquid crystal layer 300 from an inflow of impurities. However, the present disclosure is not limited thereto, the overcoating layer 220 may be omitted.

A column spacer 231 is disposed on the overcoating layer 220. The column spacer 231 is disposed in the display area DA to maintain a uniform gap between the first substrate 210 and the second substrate 110. In one embodiment, the column spacer 231 may be disposed in the display area DA of the first substrate 210 and covered by a first alignment layer AL1.

The first alignment layer AL1 may be formed on the first substrate 210 on which the column spacer 231 is formed. The first alignment layer AL1 may include polyimide compound, polyamic acid compound, or a mixture thereof.

A blocking dam is formed in the peripheral area PA. The blocking dam overlaps the gap maintaining pattern 214. The blocking dam is disposed in the same layer as the column spacer 231. The blocking dam may include a material substantially the same as the material of the column spacer 231. A height of the blocking dam may be substantially the same as a height of the column spacer 231.

According to one embodiment, the blocking dam includes a first blocking dam 232 and a second blocking dam 233. The second blocking dam 233 is disposed adjacent to the first blocking dam 232. The second blocking dam 233 may extend in a direction parallel to the first blocking dam 232. A distance between the first blocking dam 232 and the second blocking dam 233 may be equal to or greater than about 2.5 mm and equal to or less than about 3.5 mm.

A sealing member 240 is disposed between the first blocking dam 232 and the second blocking dam 233. The sealing member 240 may be disposed in an area defined by the first blocking dam 232 and the second blocking dam 233. The sealing member 240 may attach the first substrate 210 to the second substrate 110. The sealing member 240 is disposed between the first blocking dam 232 and the second blocking dam 233 so that a width of the sealing member 240 may be uniformly formed. Accordingly, the difference between the gap of the first and second substrates 210 and 110 in the display area DA and the gap of the first and second substrates 210 and 110 in the peripheral area PA may be decreased. A stain that may be formed due to the difference between the gap of the first and second substrates 210 and 110 in the display area DA and the gap of the first and second substrates 210 and 110 in the peripheral area PA may be reduced.

In addition, the blocking dam is formed in a uniform height so that a seal spacer may be omitted. Thus, the manufacturing cost of the display apparatus may be decreased.

An array layer TL and a second alignment layer AL2 are disposed on the second substrate 110.

Figure 11:
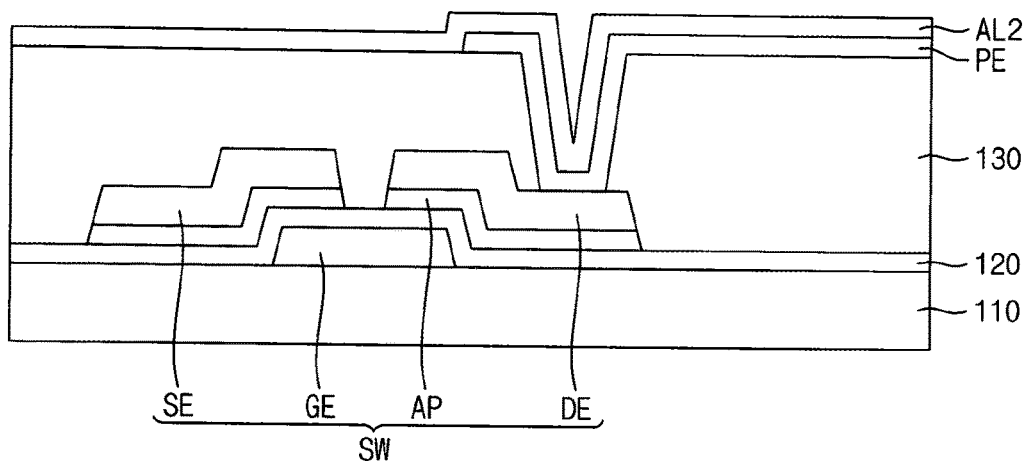

Referring to FIG. 11, the array layer TL includes a gate electrode GE, an insulating layer 120, an active pattern AP, a source electrode SE, a drain electrode DE, an organic layer 130, and a pixel electrode PE.

The gate electrode GE is disposed on the second substrate 110. The gate electrode GE is electrically connected to a gate line. The gate electrode GE may include copper (Cu), silver (Ag), chromium (Cr), molybdenum (Mo), aluminum (Al), titanium (Ti), manganese (Mn), or an alloy thereof. The gate electrode GE may include a single layer. Alternatively, the gate electrode GE may include plural layers including different metals. For example, the gate electrode GE may include a lower layer including titanium (Ti) and an upper layer disposed on the lower layer and including copper (Cu).

The insulating layer 120 is formed on the gate electrode GE. The insulating layer 120 covers the second substrate 110 and a conductive pattern that includes the gate electrode GE. The insulating layer 120 may include an inorganic insulating material. For example, the insulating layer 120 may include silicon oxide (SiOx) or silicon nitride (SiNx). For example, the insulating layer 120 may include silicon oxide (SiOx) and have a thickness of 500□. The insulating layer 120 may have plural layers including different materials.

The active pattern AP is formed on the insulating layer 120. The active pattern AP is formed on the insulating layer 120. The active pattern AP is formed in an area where the gate electrode GE is formed. The active pattern AP overlaps the gate electrode GE. The active pattern AP partially overlaps the source electrode SE and the drain electrode DE. The active pattern AP may be disposed between the gate electrode GE and the source electrode SE and between the gate electrode GE and the drain electrode DE.

The source electrode SE and the drain electrode DE are formed on the active pattern AP. The source electrode SE and the drain electrode DE are spaced apart from each other on the active pattern AP. The source electrode SE and the drain electrode DE may be formed in the same layer as a data line.

The source electrode SE and the drain electrode DE may include copper (Cu), silver (Ag), chromium (Cr), molybdenum (Mo), aluminum (Al), titanium (Ti), manganese (Mn), or an alloy thereof. The source electrode SE and the drain electrode DE may include a single layer. Alternatively, the source electrode SE and the drain electrode DE may include plural layers including different metals. For example, the source electrode SE and the drain electrode DE may include a copper (Cu) layer and a titanium (Ti) layer disposed on or under the copper (Cu) layer.

The organic layer 130 is formed on the source electrode SE and the drain electrode DE. The organic layer 130 planarizes an upper surface of the second substrate 110 so that a defect that may occur due to the uneven upper surface such as a cut-off of a signal wiring may be prevented. The organic layer 130 may be an insulating layer including an organic material.

The pixel electrode PE is formed on the organic layer 130. The pixel electrode PE is electrically connected to the drain electrode DE through a contact hole. The pixel electrode PE may include a transparent material and a conductive material. For example, the pixel electrode PE may include indium tin oxide (ITO) or indium zinc oxide (IZO). Alternatively, the pixel electrode PE may include titanium (Ti) or an alloy (MoTi) of molybdenum and titanium.

FIGS. 3 to 11 are cross-sectional views illustrating a method of manufacturing the display apparatus 10 of FIG. 2.

Figure 3:
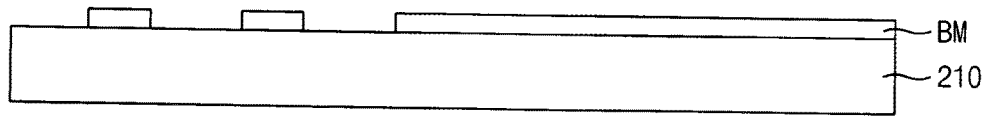
FIGS. 3, 4, 5, 6, 7, 8, 9, 10 and 11 are cross-sectional views illustrating a method of manufacturing the display apparatus of FIG. 2.

Referring to FIG. 3, the light blocking pattern BM is formed on the first substrate 210.

The light blocking pattern BM may be disposed between the color filters of the display area DA and in the peripheral area PA. The light blocking pattern BM may block light.

Figure 4:
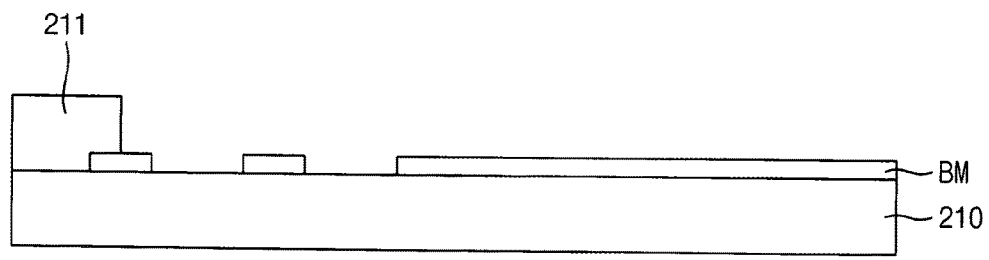

Referring to FIG. 4, the first color filter 211 is formed on the first substrate 210 on which the light blocking pattern BM is formed.

The color filter may include the first color filter 211, the second color filter 212, and the third color filter 213. The first color filter 211 may be a red color filter including a red material. The second color filter 212 may be a green color filter including a green material. The third color filter 213 may be a blue color filter including a blue material. For example, the height of the first color filter 211 may be equal to or greater than about 1.5 um and equal to or less than about 1.8 um.

Figure 5:
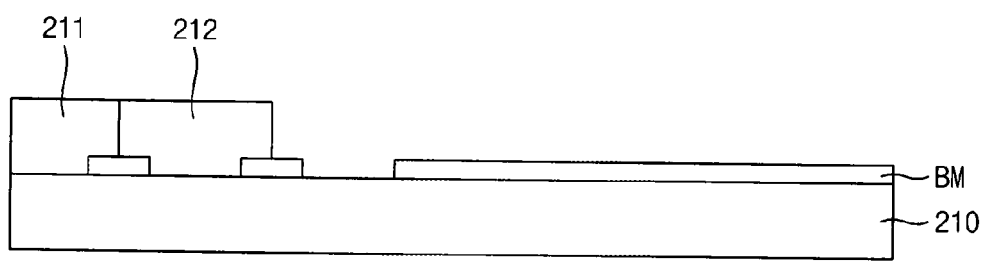

Referring to FIG. 5, the second color filter 212 is formed on the first substrate 210 on which the first color filter 211 is formed.

The second color filter 212 may be disposed adjacent to the first color filter 211. The second color filter 212 may be the green color filter including the green material. A height of the second color filter 212 may be substantially the same as the height of the first color filter 211. For example, the height of the second color filter 212 may be equal to or greater than about 1.5 um and equal to or less than about 1.8 um.

Figure 6:
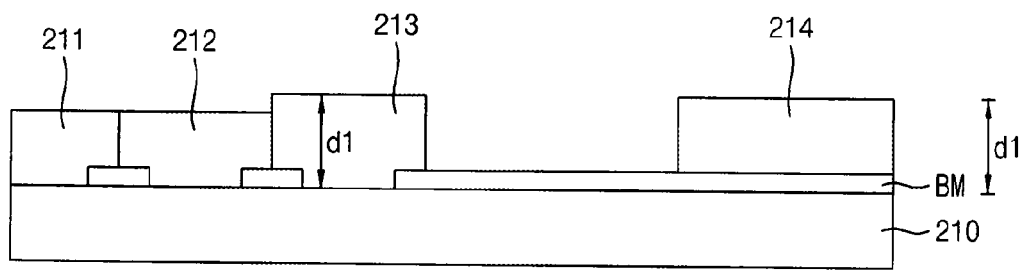

Referring to FIG. 6, the third color filter 213 and the gap maintaining pattern 214 are formed on the first substrate 210 on which the second color filter 212 is formed.

The third color filter 213 may be disposed adjacent to the second color filter 212. The third color filter 213 may be the blue color filter including the blue material. For example, a height of the third color filter 213 may be equal to or greater than about 1.7 um and equal to or less than about 2.3 um.

The gap maintaining pattern 214 is disposed in the peripheral area PA of the display apparatus 10. In the present exemplary embodiment, the gap maintaining pattern 214 may include a material substantially the same as a material of the third color filter 213. The gap maintaining pattern 214 may be formed in a process of forming the third color filter 213. The gap maintaining pattern 214 may have a height d1 that is substantially the same as a height of the third color filter 213. For example, the height of the third color filter 213 may be equal to or greater than about 1.7 um and equal to or less than about 2.3 um. The height of the gap maintaining pattern 214 may be equal to or greater than about 1.7 um and equal to or less than about 2.3 um.

Figure 7:
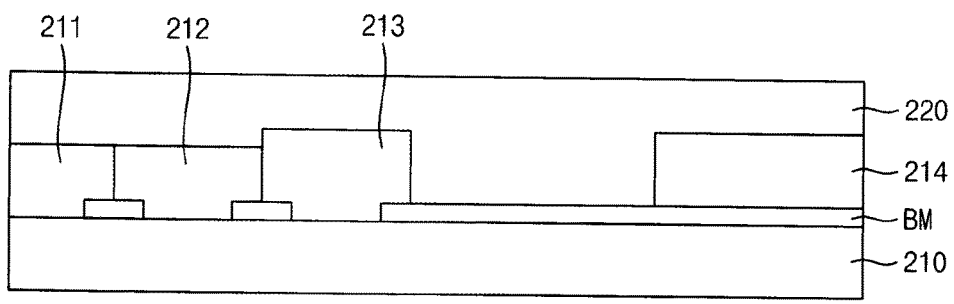

Referring to FIG. 7, the overcoating layer 220 is formed on the first substrate 210 on which the third color filter 213 and the gap maintaining pattern 214 are formed.

The overcoating layer 220 is formed on the color filters 211, 212, and 213 and the gap maintaining pattern 214. The overcoating layer 220 planarizes the first substrate 210 to minimize the difference of the thickness of the first substrate 210. In addition, the overcoating layer 220 may prevent the liquid crystal layer 300 from an inflow of impurities. However, the present disclosure is not limited thereto, the overcoating layer 220 may be omitted.

Figure 8:
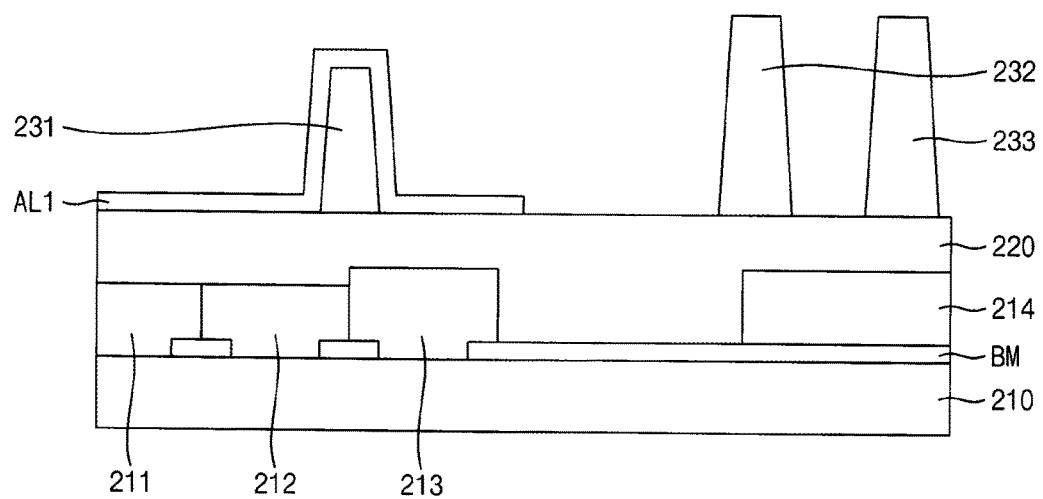

Referring to FIG. 8, the column spacer 231, the first alignment layer AL1, and the blocking dam are formed on the first substrate 210 on which the overcoating layer 220 is formed.

The column spacer 231 is disposed on the overcoating layer 220. The column spacer 231 is disposed in the display area DA to maintain a uniform gap between the first substrate 210 and the second substrate 110. The column spacer 231 may be disposed in the display area DA of the first substrate 210 and covered by a first alignment layer AL1.

The first alignment layer AL1 may be formed on the first substrate 210 on which the column spacer 231 is formed. The first alignment layer AL1 may include polyimide compound, polyamic acid compound, or a mixture thereof.

The blocking dam is formed in the peripheral area PA. The blocking dam overlaps the gap maintaining pattern 214. The blocking dam is disposed in the same layer as the column spacer 231. The blocking dam may include a material substantially the same as the material of the column spacer 231. A height of the blocking dam may be substantially the same as a height of the column spacer 231.

According to one embodiment, the blocking dam includes the first blocking dam 232 and the second blocking dam 233. The second blocking dam 233 is disposed adjacent to the first blocking dam 232. The second blocking dam 233 may extend in a direction parallel to the first blocking dam 232. A distance between the first blocking dam 232 and the second blocking dam 233 may be equal to or greater than about 2.5 mm and equal to or less than about 3.5 mm.

The sealing member 240 is disposed between the first blocking dam 232 and the second blocking dam 233. The sealing member 240 may be disposed in an area defined by the first blocking dam 232 and the second blocking dam 233. The sealing member 240 may attach the first substrate 210 to the second substrate 110. The sealing member 240 is disposed between the first blocking dam 232 and the second blocking dam 233 so that a width of the sealing member 240 may be uniformly formed. Accordingly, the difference between the gap of the first and second substrates 210 and 110 in the display area DA and the gap of the first and second substrates 210 and 110 in the peripheral area PA may be decreased. A stain that may be formed due to the difference between the gap of the first and second substrates 210 and 110 in the display area DA and the gap of the first and second substrates 210 and 110 in the peripheral area PA may be reduced.

In addition, the blocking dam is formed in a uniform height so that a seal spacer may be omitted. Thus, the manufacturing cost of the display apparatus may be decreased.

Figure 9:
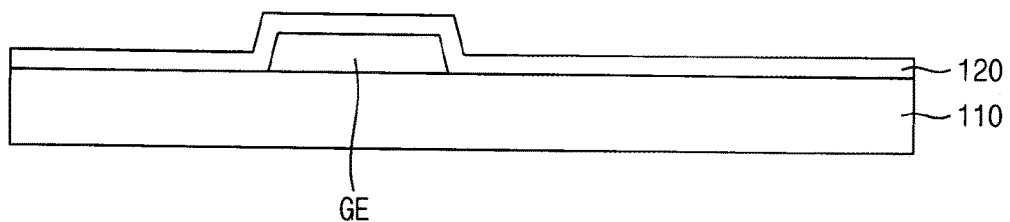

Referring to FIG. 9, the gate electrode GE and the insulating layer 120 are formed on the second substrate 110.

The gate electrode GE is disposed on the second substrate 110. The gate electrode GE is electrically connected to a gate line. The gate electrode GE may include copper (Cu), silver (Ag), chromium (Cr), molybdenum (Mo), aluminum (Al), titanium (Ti), manganese (Mn) or an alloy thereof. The gate electrode GE may include a single layer. Alternatively, the gate electrode GE may include plural layers including different metals. For example, the gate electrode GE may include a lower layer including titanium (Ti) and an upper layer disposed on the lower layer and including copper (Cu).

The insulating layer 120 is formed on the gate electrode GE. The insulating layer 120 covers the second substrate 110 and a conductive pattern that includes the gate electrode GE.

The insulating layer 120 may include an inorganic insulating material. For example, the insulating layer 120 may include silicon oxide (SiOx) or silicon nitride (SiNx). For example, the insulating layer 120 may include silicon oxide (SiOx) and have a thickness of 500☐. The insulating layer 120 may have plural layers including different materials.

Figure 10:
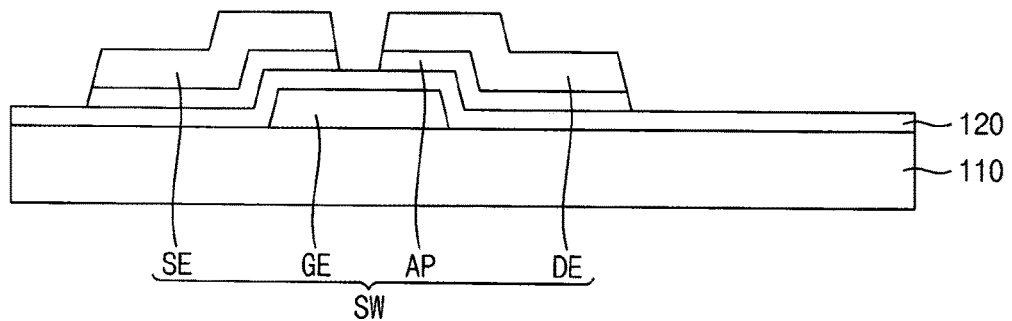

Referring to FIG. 10, the active pattern AP, the source electrode SE, and the drain electrode DE are formed on the second substrate 110 on which the insulating layer 120 is formed.

The active pattern AP is formed on the insulating layer 120. The active pattern AP is formed on the insulating layer 120. The active pattern AP is formed in an area where the gate electrode GE is formed. The active pattern AP overlaps the gate electrode GE. The active pattern AP partially overlaps the source electrode SE and the drain electrode DE. The active pattern AP may be disposed between the gate electrode GE and the source electrode SE and between the gate electrode GE and the drain electrode DE.

The source electrode SE and the drain electrode DE are formed on the active pattern AP. The source electrode SE and the drain electrode DE are spaced apart from each other on the active pattern AP. The source electrode SE and the drain electrode DE may be formed on the same layer as a data line.

The source electrode SE and the drain electrode DE may include copper (Cu), silver (Ag), chromium (Cr), molybdenum (Mo), aluminum (Al), titanium (Ti), manganese (Mn) or an alloy thereof. The source electrode SE and the drain electrode DE may include a single layer. Alternatively, the source electrode SE and the drain electrode DE may include plural layers including different metals. For example, the source electrode SE and the drain electrode DE may include a copper (Cu) layer and a titanium (Ti) layer disposed on or under the copper (Cu) layer.

Referring to FIG. 11, the organic layer 130, the pixel electrode PE, and the second alignment layer AL2 are formed on the second substrate 110 on which the source electrode SE and the drain electrode DE are formed.

The organic layer 130 is formed on the source electrode SE and the drain electrode DE. The organic layer 130 planarizes an upper surface of the second substrate 110 so that a defect that may be caused due to the uneven upper surface such as a cut-off of a signal wiring may be prevented. The organic layer 130 may be an insulating layer including an organic material.

The pixel electrode PE is formed on the organic layer 130. The pixel electrode PE is electrically connected to the drain electrode DE through the contact hole. The pixel electrode PE may include a transparent material and a conductive material. For example, the pixel electrode PE may include indium tin oxide (ITO) or indium zinc oxide (IZO). Alternatively, the pixel electrode PE may include titanium (Ti) or an alloy (MoTi) of molybdenum and titanium.

The second alignment layer AL2 may be formed on the organic layer 130 and the pixel electrode PE. The second alignment layer AL2 may include polyimide compound, polyamic acid compound, or a mixture thereof.

Figure 12:
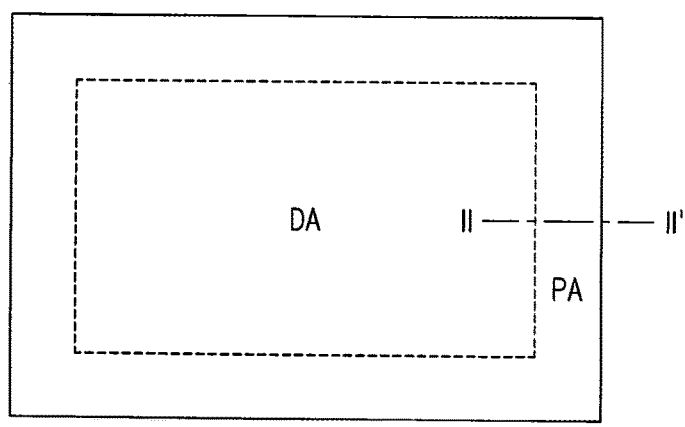
FIG. 12 is a plan view illustrating a display apparatus according to an exemplary embodiment of the present disclosure.
Figure 13:
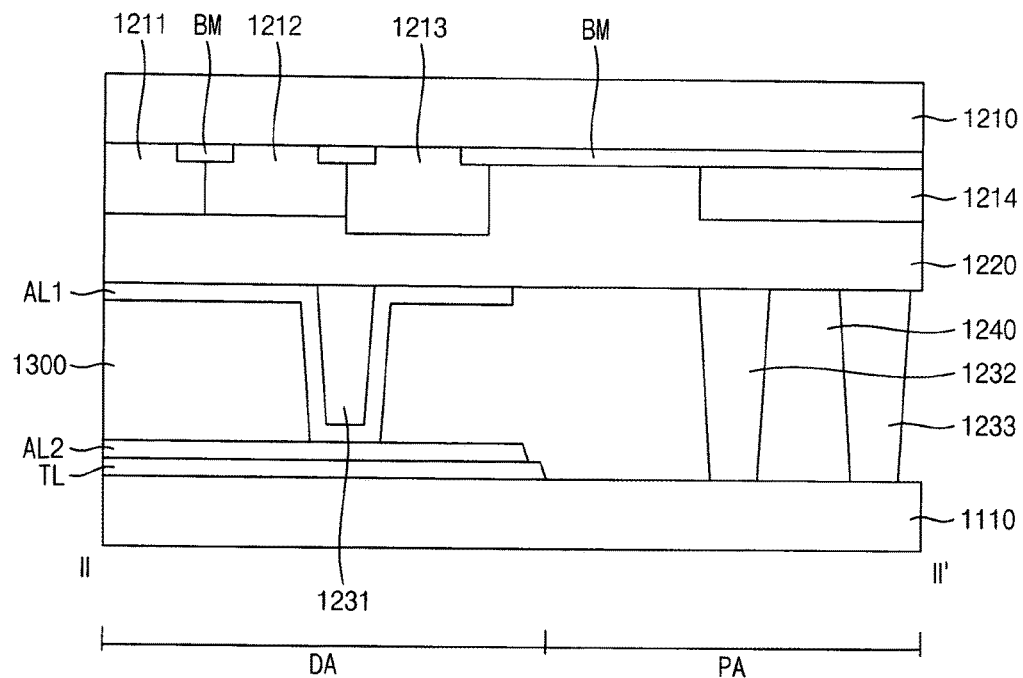
FIG. 13 is a cross-sectional view illustrating the display apparatus of FIG. 12 cut along a line II-II'.

FIG. 12 is a plan view illustrating a display apparatus according to an exemplary embodiment of the present disclosure. FIG. 13 is a cross-sectional view illustrating the display apparatus of FIG. 12 cut along a line II-II'.

Referring to FIGS. 12 and 13, the display apparatus 20 includes a display area DA and a peripheral area PA adjacent to the display area DA. The display area DA may have a similar shape of the display apparatus 20. For example, the display area DA may have a rectangular shape.

The display apparatus 20 includes a first substrate 1210, a second substrate 1110 facing the first substrate 1210, and a liquid crystal layer 1300 disposed between the first substrate 1210 and the second substrate 1110.

A light blocking pattern BM is disposed on the first substrate 1210. The light blocking pattern BM may be disposed between color filters of the display area DA and in the peripheral area PA. The light blocking pattern BM may block light.

The color filter is disposed on the first substrate 1210 on which the light blocking pattern BM is formed. The color filter provides color to the light passed through the liquid crystal layer 1300. The color filter may include a first color filter 1211, a second color filter 1212 and a third color filter 1213. The first color filter 1211 may be a red color filter including a red material. The second color filter 1212 may be a green color filter including a green material. The third color filter 1213 may be a blue color filter including a blue material. The color filters 1211, 1212, and 1213 may be disposed corresponding to respective pixel areas such that the adjacent pixels represent colors that are different from each other. For example, a portion of the color filter may be overlapped by the adjacent color filter at a boundary between the pixel areas. The color filters 1211, 1212, and 1213 are disposed in the display area DA.

A gap maintaining pattern 1214 is disposed in the peripheral area PA of the display apparatus 20. In the present exemplary embodiment, the gap maintaining pattern 1214 may include a material substantially the same as a material of the first color filter 1211. The gap maintaining pattern 1214 may be formed in a process of forming the first color filter 1211. The gap maintaining pattern 1214 may have a height substantially the same as a height of the first color filter 1211. For example, the height of the first color filter 1211 may be equal to or greater than about 1.5 um and equal to or less than about 1.8 um. The height of the gap maintaining pattern 1214 may be equal to or greater than about 1.5 um and equal to or less than about 1.8 um.

An overcoating layer 1220 is formed on the color filter 1211, 1212 and 1213 and the gap maintaining pattern 1214. The overcoating layer 1220 planarizes the first substrate 1210 to minimize the difference of the thickness of the first substrate 1210. In addition, the overcoating layer 1220 may prevent the liquid crystal layer 1300 from an inflow of impurities. However, the present disclosure is not limited thereto, the overcoating layer 1220 may be omitted.

A column spacer 1231 is disposed on the overcoating layer 1220. The column spacer 1231 is disposed in the display area DA to maintain a uniform gap between the first substrate 1210 and the second substrate 1110. In one embodiment, the column spacer 1231 may be disposed in the display area DA of the first substrate 1210 and covered by a first alignment layer AL1.

The first alignment layer AL1 may be formed on the first substrate 1210 on which the column spacer 1231 is formed. The first alignment layer AL1 may include polyimide compound, polyamic acid compound, or a mixture thereof.

A blocking dam is formed in the peripheral area PA. The blocking dam overlaps the gap maintaining pattern 1214. The blocking dam is disposed in the same layer as the column spacer 1231. The blocking dam may include a material substantially the same as the material of the column spacer 1231. A height of the blocking dam may be substantially the same as a height of the column spacer 1231.

According to one embodiment, the blocking dam includes a first blocking dam 1232 and a second blocking dam 1233. The second blocking dam 1233 is disposed adjacent to the first blocking dam 1232. The second blocking dam 1233 may extend in a direction parallel to the first blocking dam 1232. A distance between the first blocking dam 1232 and the second blocking dam 1233 may be equal to or greater than about 2.5 mm and equal to or less than about 3.5 mm.

A sealing member 1240 is disposed between the first blocking dam 1232 and the second blocking dam 1233. The sealing member 1240 may be disposed in an area defined by the first blocking dam 1232 and the second blocking dam 1233. The sealing member 1240 may attach the first substrate 1210 to the second substrate 1110. The sealing member 1240 is disposed between the first blocking dam 1232 and the second blocking dam 1233 so that a width of the sealing member 1240 may be uniformly formed. Accordingly, the difference between the gap of the first and second substrates 1210 and 1110 in the display area DA and the gap of the first and second substrates 1210 and 1110 in the peripheral area PA may be decreased. A stain that may be formed due to the difference between the gap of the first and second substrates 1210 and 1110 in the display area DA and the gap of the first and second substrates 1210 and 1110 in the peripheral area PA may be reduced.

In addition, the blocking dam is formed in a uniform height so that a seal spacer may be omitted. Thus, the manufacturing cost of the display apparatus may be decreased.

An array layer TL and a second alignment layer AL2 are disposed on the second substrate 1110.

The second substrate 1110 of the present exemplary embodiment is substantially the same as the second substrate of the display apparatus of the previous exemplary embodiment explained referring to FIGS. 1 to 11. Thus, the same reference numerals will be used to refer to the same or like parts as those described in the previous exemplary embodiment described with respect to FIGS. 1 to 11.

Referring to FIG. 11, the array layer TL includes a gate electrode GE, an insulating layer 120, an active pattern AP, a source electrode SE, a drain electrode DE, an organic layer 130, and a pixel electrode PE.

The gate electrode GE is disposed on the second substrate 110. The gate electrode GE is electrically connected to a gate line. The gate electrode GE may include copper (Cu), silver (Ag), chromium (Cr), molybdenum (Mo), aluminum (Al), titanium (Ti), manganese (Mn), or an alloy thereof. The gate electrode GE may include a single layer. Alternatively, the gate electrode GE may include plural layers including different metals. For example, the gate electrode GE may include a lower layer including titanium (Ti) and an upper layer disposed on the lower layer and including copper (Cu).

The insulating layer 120 is formed on the gate electrode GE. The insulating layer 120 covers the second substrate 110 and a conductive pattern that includes the gate electrode GE. The insulating layer 120 may include an inorganic insulating material. For example, the insulating layer 120 may include silicon oxide (SiOx) or silicon nitride (SiNx). For example, the insulating layer 120 may include silicon oxide (SiOx) and have a thickness of 500□. The insulating layer 120 may have plural layers including different materials.

The active pattern AP is formed on the insulating layer 120. The active pattern AP is formed on the insulating layer 120. The active pattern AP is formed in an area where the gate electrode GE is formed. The active pattern AP overlaps the gate electrode GE. The active pattern AP partially overlaps the source electrode SE and the drain electrode DE. The active pattern AP may be disposed between the gate electrode GE and the source electrode SE and between the gate electrode GE and the drain electrode DE.

The source electrode SE and the drain electrode DE are formed on the active pattern AP. The source electrode SE and the drain electrode DE are spaced apart from each other on the active pattern AP. The source electrode SE and the drain electrode DE may be formed on the same layer as a data line.

The source electrode SE and the drain electrode DE may include copper (Cu), silver (Ag), chromium (Cr), molybdenum (Mo), aluminum (Al), titanium (Ti), manganese (Mn), or an alloy thereof. The source electrode SE and the drain electrode DE may include a single layer. Alternatively, the source electrode SE and the drain electrode DE may include plural layers including different metals. For example, the source electrode SE and the drain electrode DE may include a copper (Cu) layer and a titanium (Ti) layer disposed on or under the copper (Cu) layer.

The organic layer 130 is formed on the source electrode SE and the drain electrode DE. The organic layer 130 planarizes an upper surface of the second substrate 110 so that a defect that may occur due to the uneven upper surface such as a cut-off of a signal wiring may be prevented. The organic layer 130 may be an insulating layer including an organic material.

The pixel electrode PE is formed on the organic layer 130. The pixel electrode PE is electrically connected to the drain electrode DE through a contact hole. The pixel electrode PE may include a transparent material and a conductive material. For example, the pixel electrode PE may include indium tin oxide (ITO) or indium zinc oxide (IZO). Alternatively, the pixel electrode PE may include titanium (Ti) or an alloy (MoTi) of molybdenum and titanium.

FIGS. 14 to 18 are cross-sectional views illustrating a method of manufacturing the display apparatus 20 of FIG. 13.

Figure 14:
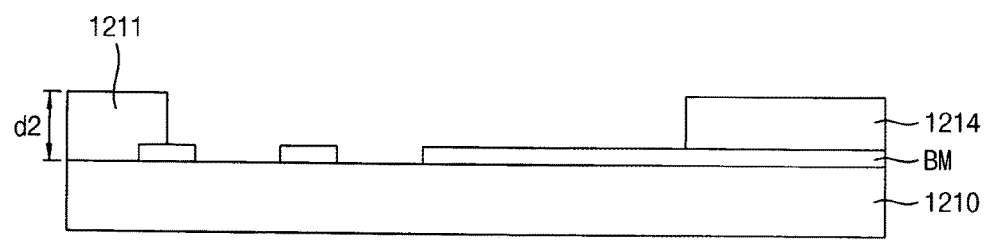
FIGS. 14, 15, 16, 17 and 18 are cross-sectional views illustrating a method of manufacturing the display apparatus of FIG. 13.

Referring to FIG. 14, the light blocking pattern BM is formed on the first substrate 1210. Then, the first color filter 1211 and the gap maintaining pattern 1214 are formed on the first substrate 1210 on which the light blocking pattern BM is formed.

The light blocking pattern BM is formed on the first substrate 1210. The light blocking pattern BM may be disposed between the color filters of the display area DA and in the peripheral area PA. The light blocking pattern BM may block light.

The color filter may include the first color filter 1211, the second color filter 1212, and the third color filter 1213. The first color filter 1211 may be a red color filter including a red material. The second color filter 1212 may be a green color filter including a green material. The third color filter 1213 may be a blue color filter including a blue material. For example, the height of the first color filter 1211 may be equal to or greater than about 1.5 um and equal to or less than about 1.8 um.

The gap maintaining pattern 1214 is disposed in the peripheral area PA of the display apparatus 20. In the present exemplary embodiment, the gap maintaining pattern 1214 may include a material substantially the same as a material of the first color filter 1211. The gap maintaining pattern 1214 may be formed in a process of forming the first color filter 1211. The gap maintaining pattern 1214 may have a height d2 that is substantially the same as a height of the first color filter 1211. For example, the height of the first color filter 1211 may be equal to or greater than about 1.5 um and equal to or less than about 1.8 um. The height of the gap maintaining pattern 1214 may be equal to or greater than about 1.5 um and equal to or less than about 1.8 um.

Figure 15:
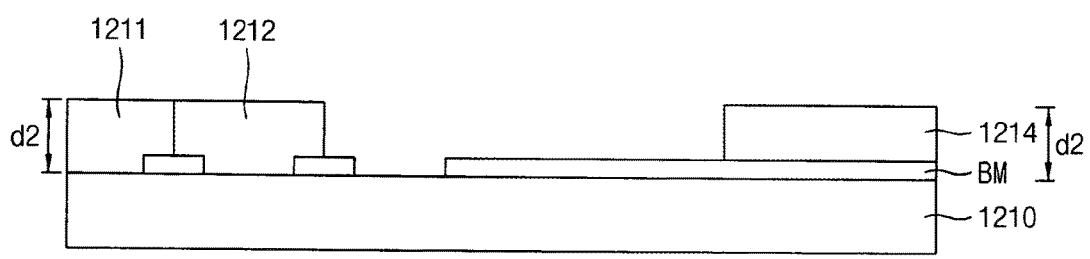

Referring to FIG. 15, the second color filter 1212 is formed on the first substrate 1210 on which the first color filter 1211 and the gap maintaining pattern 1214 are formed.

The second color filter 1212 may be disposed adjacent to the first color filter 1211. The second color filter 1212 may be the green color filter including the green material. A height of the second color filter 1212 may be substantially the same as the height of the first color filter 1211. For example, the height of the second color filter 1212 may be equal to or greater than about 1.5 um and equal to or less than about 1.8 um.

Figure 16:
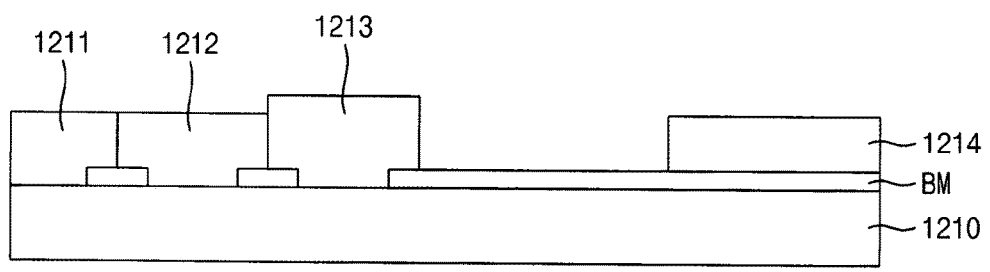

Referring to FIG. 16, the third color filter 1213 is formed on the first substrate 1210 on which the second color filter 1212 is formed.

The third color filter 1213 may be disposed adjacent to the second color filter 1212. The third color filter 1213 may be the blue color filter including the blue material. For example, the height of the third color filter 1213 may be equal to or greater than about 1.7 um and equal to or less than about 2.3 um.

Figure 17:
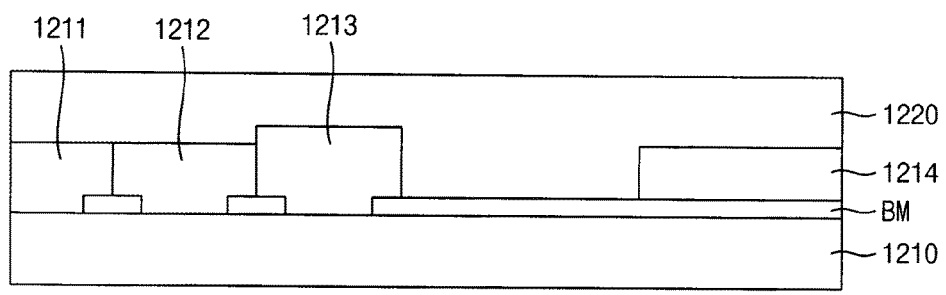

Referring to FIG. 17, the overcoating layer 1220 is formed on the first substrate 1210 on which the third color filter 1213 is formed.

The overcoating layer 1220 is formed on the color filter 1211, 1212, and 1213 and the gap maintaining pattern 1214. The overcoating layer 1220 planarizes the first substrate 1210 to minimize the difference of the thickness of the first substrate 1210. In addition, the overcoating layer 1220 may prevent the liquid crystal layer 1300 from an inflow of impurities. However, the present disclosure is not limited thereto, the overcoating layer 1220 may be omitted.

Figure 18:
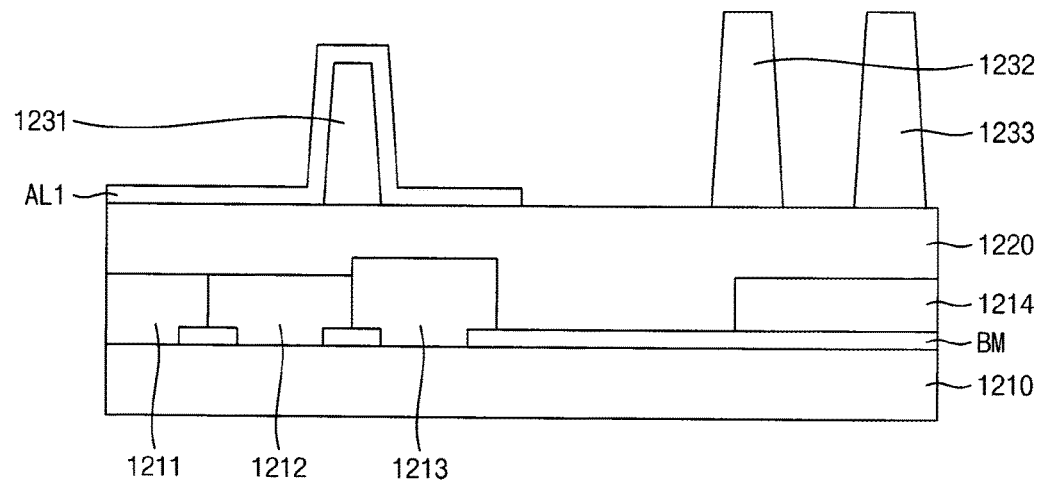

Referring to FIG. 18, the column spacer 1231, the first alignment layer AL1, and the blocking dam are formed on the first substrate 1210 on which the overcoating layer 1220 is formed.

The column spacer 1231 is disposed on the overcoating layer 1220. The column spacer 1231 is disposed in the display area DA to maintain a uniform gap between the first substrate 1210 and the second substrate 1110. The column spacer 1231 may be disposed on the display area DA of the first substrate 1210 and covered by a first alignment layer AL1.

The first alignment layer AL1 may be formed on the first substrate 1210 on which the column spacer 1231 is formed. The first alignment layer AL1 may include polyimide compound, polyamic acid compound, or a mixture thereof.

The blocking dam is formed in the peripheral area PA. The blocking dam overlaps the gap maintaining pattern 1214. The blocking dam is disposed in the same layer as the column spacer 1231. The blocking dam may include a material substantially the same as the material of the column spacer 1231. A height of the blocking dam may be substantially the same as a height of the column spacer 1231.

According to one embodiment, the blocking dam includes the first blocking dam 1232 and the second blocking dam 1233. The second blocking dam 1233 is disposed adjacent to the first blocking dam 1232. The second blocking dam 1233 may extend in a direction parallel to the first blocking dam 1232. A distance between the first blocking dam 1232 and the second blocking dam 1233 may be equal to or greater than about 2.5 mm and equal to or less than about 3.5 mm.

The sealing member 1240 is disposed between the first blocking dam 1232 and the second blocking dam 1233. The sealing member 1240 may be disposed in an area defined by the first blocking dam 1232 and the second blocking dam 1233. The sealing member 1240 may attach the first substrate 1210 to the second substrate 1110. The sealing member 1240 is disposed between the first blocking dam 1232 and the second blocking dam 1233 so that a width of the sealing member 1240 may be uniformly formed. Accordingly, the difference between the gap of the first and second substrates 1210 and 1110 in the display area DA and the gap of the first and second substrates 1210 and 1110 in the peripheral area PA may be decreased. A stain that may be formed due to the difference between the gap of the first and second substrates 1210 and 1110 in the display area DA and the gap of the first and second substrates 1210 and 1110 in the peripheral area PA may be reduced.

In addition, the blocking dam is formed in a uniform height so that a seal spacer may be omitted. Thus, the manufacturing cost of the display apparatus may be decreased.

The method of manufacturing the second substrate 1110 of the present exemplary embodiment is substantially the same as the method of manufacturing the second substrate of the display apparatus of the previous exemplary embodiment explained referring to FIGS. 1 to 11. Thus, any repetitive explanation concerning the method of manufacturing the second substrate 1110 will be omitted.

Figure 19:
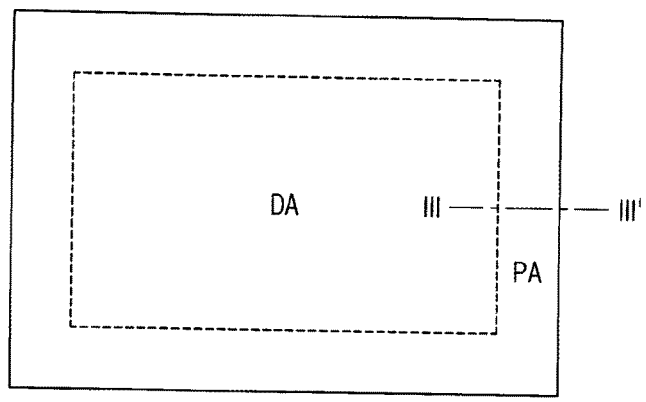
FIG. 19 is a plan view illustrating a display apparatus according to an exemplary embodiment of the present disclosure.
Figure 20:
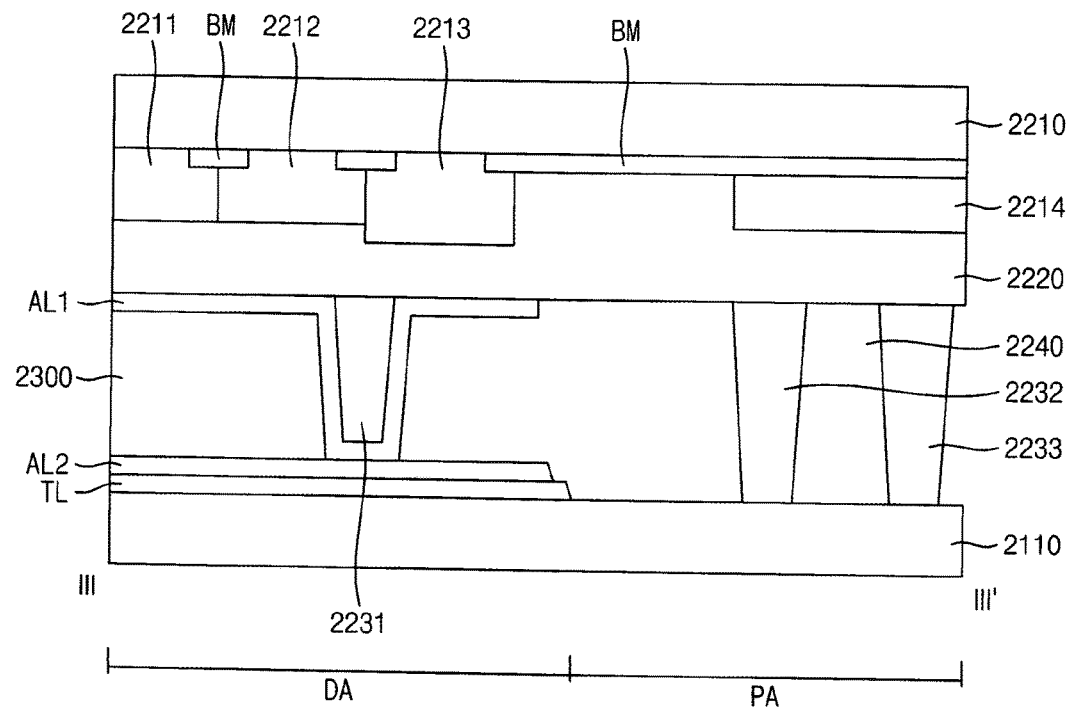
FIG. 20 is a cross-sectional view illustrating the display apparatus of FIG. 19 cut along a line III-III'.

FIG. 19 is a plan view illustrating a display apparatus according to an exemplary embodiment of the present disclosure. FIG. 20 is a cross-sectional view illustrating the display apparatus of FIG. 19 cut along a line III-III'.

Referring to FIGS. 19 and 20, the display apparatus 30 includes a display area DA and a peripheral area PA adjacent to the display area DA. The display area DA may have a similar shape of the display apparatus 30. For example, the display area DA may have a rectangular shape.

The display apparatus 30 includes a first substrate 2210, a second substrate 2110 facing the first substrate 2210, and a liquid crystal layer 2300 disposed between the first substrate 2210 and the second substrate 2110.

A light blocking pattern BM is disposed on the first substrate 2210. The light blocking pattern BM may be disposed between color filters of the display area DA and in the peripheral area PA. The light blocking pattern BM may block light.

The color filter is disposed on the first substrate 2210 on which the light blocking pattern BM is formed. The color filter provides color to the light passed through the liquid crystal layer 2300. The color filter may include a first color filter 2211, a second color filter 2212 and a third color filter 2213. The first color filter 2211 may be a red color filter including a red material. The second color filter 2212 may be a green color filter including a green material. The third color filter 2213 may be a blue color filter including a blue material. The color filters 2211, 2212, and 2213 may be disposed corresponding to respective pixel areas such that the adjacent pixels represent colors different from each other. For example, a portion of the color filter may be overlapped by the adjacent color filter at a boundary between the pixel areas. The color filters 2211, 2212, and 2213 are disposed in the display area DA.

A gap maintaining pattern 2214 is disposed in the peripheral area PA of the display apparatus 20. In the present exemplary embodiment, the gap maintaining pattern 2214 may include a material substantially the same as a material of the second color filter 2212. The gap maintaining pattern 2214 may be formed in a process of forming the second color filter 2212. The gap maintaining pattern 2214 may have a height substantially the same as a height of the second color filter 2212. For example, the height of the second color filter 2212 may be equal to or greater than about 1.5 um and equal to or less than about 1.8 um. The height of the gap maintaining pattern 2214 may be equal to or greater than about 1.5 um and equal to or less than about 1.8 um.

An overcoating layer 2220 is formed on the color filter 2211, 2212 and 2213 and the gap maintaining pattern 2214. The overcoating layer 2220 planarizes the first substrate 2210 to minimize the difference of the thickness of the first substrate 2210. In addition, the overcoating layer 2220 may prevent the liquid crystal layer 2300 from an inflow of impurities. However, the present disclosure is not limited thereto, the overcoating layer 2220 may be omitted.

A column spacer 2231 is disposed on the overcoating layer 2220. The column spacer 2231 is disposed in the display area DA to maintain a uniform gap between the first substrate 2210 and the second substrate 2110. In one embodiment, the column spacer 2231 may be disposed in the display area DA of the first substrate 2210 and covered by a first alignment layer AL1.

The first alignment layer AL1 may be formed on the first substrate 2210 on which the column spacer 2231 is formed. The first alignment layer AL1 may include polyimide compound, polyamic acid compound, or a mixture thereof.

A blocking dam is formed in the peripheral area PA. The blocking dam overlaps the gap maintaining pattern 2214. The blocking dam is disposed in the same layer as the column spacer 2231. The blocking dam may include a material substantially the same as the material of the column spacer 2231. A height of the blocking dam may be substantially the same as a height of the column spacer 2231.

According to one embodiment, the blocking dam includes a first blocking dam 2232 and a second blocking dam 2233. The second blocking dam 2233 is disposed adjacent to the first blocking dam 2232. The second blocking dam 2233 may extend in a direction parallel to the first blocking dam 2232. A distance between the first blocking dam 2232 and the second blocking dam 2233 may be equal to or greater than about 2.5 mm and equal to or less than about 3.5 mm.

A sealing member 2240 is disposed between the first blocking dam 2232 and the second blocking dam 2233. The sealing member 2240 may be disposed in an area defined by the first blocking dam 2232 and the second blocking dam 2233. The sealing member 2240 may attach the first substrate 2210 to the second substrate 2110. The sealing member 2240 is disposed between the first blocking dam 2232 and the second blocking dam 2233 so that a width of the sealing member 2240 may be uniformly formed. Accordingly, the difference between the gap of the first and second substrates 2210 and 2110 in the display area DA and the gap of the first and second substrates 2210 and 2110 in the peripheral area PA may be decreased. A stain that may be formed due to the difference between the gap of the first and second substrates 2210 and 2110 in the display area DA and the gap of the first and second substrates 2210 and 2110 in the peripheral area PA may be reduced.

In addition, the blocking dam is formed in a uniform height so that a seal spacer may be omitted. Thus, the manufacturing cost of the display apparatus may be decreased.

An array layer TL and a second alignment layer AL2 are disposed on the second substrate 2110.

The second substrate 2110 of the present exemplary embodiment is substantially the same as the second substrate of the display apparatus of the previous exemplary embodiment explained referring to FIGS. 1 to 11. Thus, the same reference numerals will be used to refer to the same or like parts as those described in the previous exemplary embodiment described with respect to FIGS. 1 to 11.

Referring to FIG. 11, the array layer TL includes a gate electrode GE, an insulating layer 120, an active pattern AP, a source electrode SE, a drain electrode DE, an organic layer 130 and a pixel electrode PE.

The gate electrode GE is disposed on the second substrate 110. The gate electrode GE is electrically connected to a gate line. The gate electrode GE may include copper (Cu), silver (Ag), chromium (Cr), molybdenum (Mo), aluminum (Al), titanium (Ti), manganese (Mn) or an alloy thereof. The gate electrode GE may include a single layer. Alternatively, the gate electrode GE may include plural layers including different metals. For example, the gate electrode GE may include a lower layer including titanium (Ti) and an upper layer disposed on the lower layer and including copper (Cu).

The insulating layer 120 is formed on the gate electrode GE. The insulating layer 120 covers the second substrate 110 and a conductive pattern that includes the gate electrode GE. The insulating layer 120 may include an inorganic insulating material. For example, the insulating layer 120 may include silicon oxide (SiOx) or silicon nitride (SiNx). For example, the insulating layer 120 may include silicon oxide (SiOx) and have a thickness of 500□. The insulating layer 120 may have plural layers including different materials.

The active pattern AP is formed on the insulating layer 120. The active pattern AP is formed on the insulating layer 120. The active pattern AP is formed in an area where the gate electrode GE is formed. The active pattern AP overlaps the gate electrode GE. The active pattern AP partially overlaps the source electrode SE and the drain electrode DE. The active pattern AP may be disposed between the gate electrode GE and the source electrode SE and between the gate electrode GE and the drain electrode DE.

The source electrode SE and the drain electrode DE are formed on the active pattern AP. The source electrode SE and the drain electrode DE are spaced apart from each other on the active pattern AP. The source electrode SE and the drain electrode DE may be formed in the same layer as a data line.

The source electrode SE and the drain electrode DE may include copper (Cu), silver (Ag), chromium (Cr), molybdenum (Mo), aluminum (Al), titanium (Ti), manganese (Mn) or an alloy thereof. The source electrode SE and the drain electrode DE may include a single layer. Alternatively, the source electrode SE and the drain electrode DE may include plural layers including different metals. For example, the source electrode SE and the drain electrode DE may include a copper (Cu) layer and a titanium (Ti) layer disposed on or under the copper (Cu) layer.

The organic layer 130 is formed on the source electrode SE and the drain electrode DE. The organic layer 130 planarizes an upper surface of the second substrate 110 so that a defect that may occur due to the uneven upper surface such as a cut-off of a signal wiring may be prevented. The organic layer 130 may be an insulating layer including an organic material.

The pixel electrode PE is formed on the organic layer 130. The pixel electrode PE is electrically connected to the drain electrode DE through a contact hole. The pixel electrode PE may include a transparent material and a conductive material. For example, the pixel electrode PE may include indium tin oxide (ITO) or indium zinc oxide (IZO). Alternatively, the pixel electrode PE may include titanium (Ti) or an alloy (MoTi) of molybdenum and titanium.

FIGS. 21 to 25 are cross-sectional views illustrating a method of manufacturing the display apparatus 30 of FIG. 20.

Figure 21:
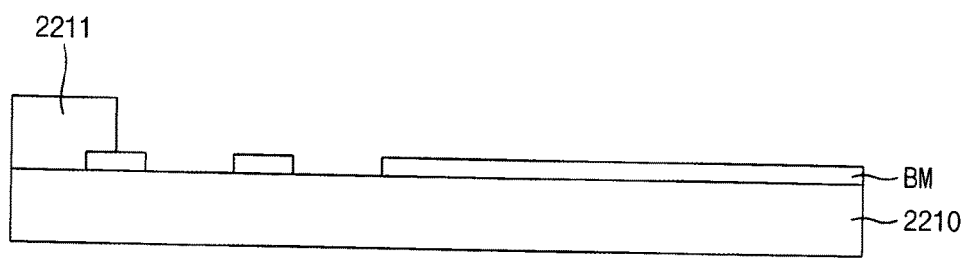
FIGS. 21, 22, 23, 24 and 25 are cross-sectional views illustrating a method of manufacturing the display apparatus of FIG. 20.

Referring to FIG. 21, the light blocking pattern BM is formed on the first substrate 2210. Then, the first color filter 2211 is formed on the first substrate 2210 on which the light blocking pattern BM is formed.

The light blocking pattern BM is formed on the first substrate 2210. The light blocking pattern BM may be disposed between the color filters of the display area DA and in the peripheral area PA. The light blocking pattern BM may block light.

The color filter may include the first color filter 2211, the second color filter 2212, and the third color filter 2213. The first color filter 2211 may be a red color filter including a red material. The second color filter 2212 may be a green color filter including a green material. The third color filter 2213 may be a blue color filter including a blue material. For example, the height of the first color filter 2211 may be equal to or greater than about 1.5 um and equal to or less than about 1.8 um.

Figure 22:
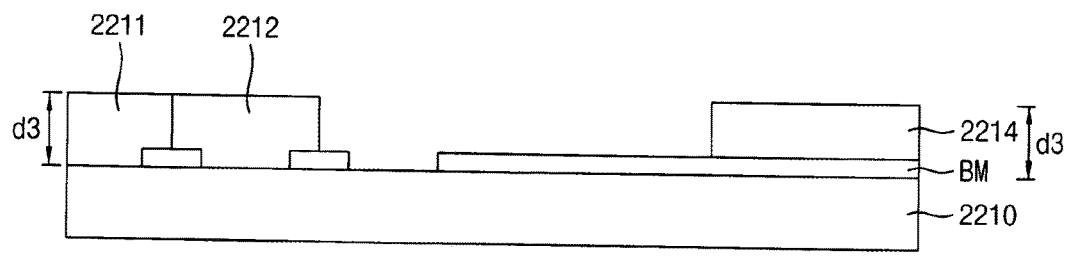

Referring to FIG. 22, the second color filter 2212 and the gap maintaining pattern 2214 are formed on the first substrate 2210 on which the first color filter 2211 is formed.

The second color filter 2212 may be disposed adjacent to the first color filter 2211. The second color filter 2212 may be the green color filter including the green material. A height of the second color filter 2212 may be substantially the same as the height of the first color filter 2211. For example, the height of the second color filter 2212 may be equal to or greater than about 1.5 um and equal to or less than about 1.8 um.

The gap maintaining pattern 2214 is disposed in the peripheral area PA of the display apparatus 30. In the present exemplary embodiment, the gap maintaining pattern 2214 may include a material substantially the same as a material of the second color filter 2212. The gap maintaining pattern 2214 may be formed in a process of forming the second color filter 2212. The gap maintaining pattern 2214 may have a height d3 that is substantially the same as a height of the second color filter 2212. For example, the height of the second color filter 2212 may be equal to or greater than about 1.5 um and equal to or less than about 1.8 um. The height of the gap maintaining pattern 2214 may be equal to or greater than about 1.5 um and equal to or less than about 1.8 um.

Figure 23:
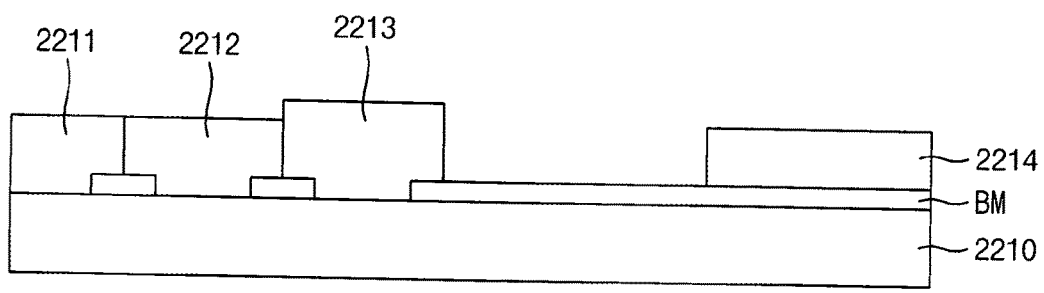

Referring to FIG. 23, the third color filter 2213 is formed on the first substrate 2210 on which the second color filter 2212 and the gap maintaining pattern 2214 are formed.

The third color filter 2213 may be disposed adjacent to the second color filter 2212. The third color filter 2213 may be the blue color filter including the blue material. For example, the height of the third color filter 2213 may be equal to or greater than about 1.7 um and equal to or less than about 2.3 um.

Figure 24:
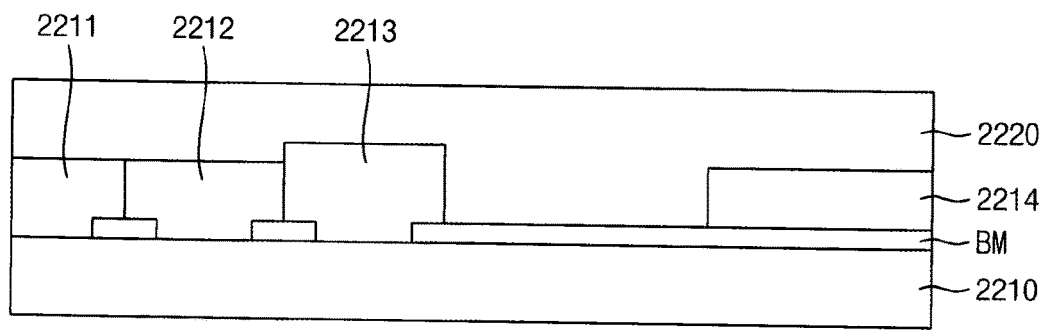

Referring to FIG. 24, the overcoating layer 2220 is formed on the first substrate 2210 on which the third color filter 2213 is formed.

The overcoating layer 2220 is formed on the color filter 2211, 2212, and 2213 and the gap maintaining pattern 2214. The overcoating layer 2220 planarizes the first substrate 2210 to minimize the difference of the thickness of the first substrate 2210. In addition, the overcoating layer 2220 may prevent the liquid crystal layer 2300 from inflow of impurities. However, the present disclosure is not limited thereto, the overcoating layer 2220 may be omitted.

Figure 25:
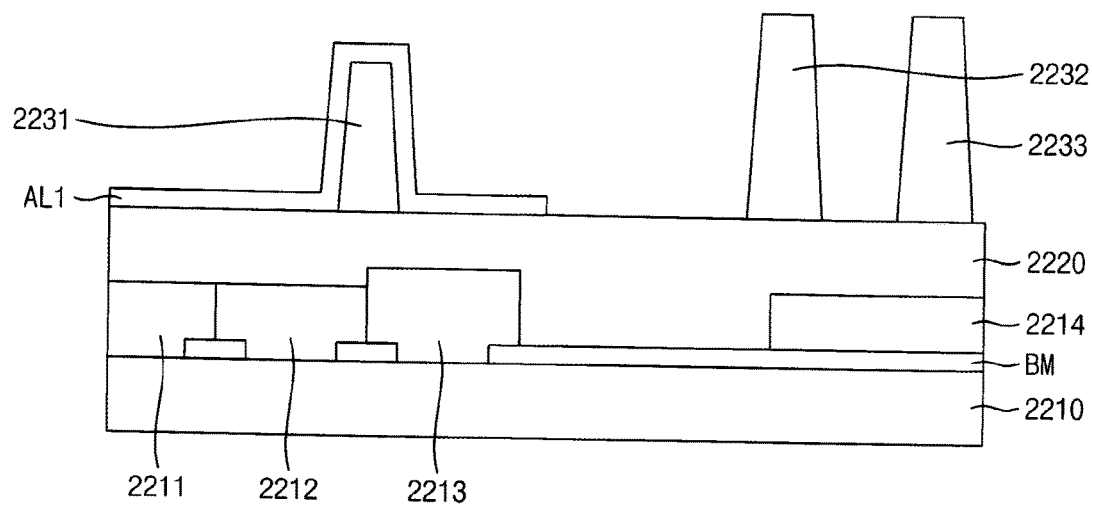

Referring to FIG. 25, the column spacer 2231, the first alignment layer ALL and the blocking dam are formed on the first substrate 2210 on which the overcoating layer 2220 is formed.

The column spacer 2231 is disposed on the overcoating layer 2220. The column spacer 2231 is disposed in the display area DA to maintain a uniform gap between the first substrate 2210 and the second substrate 2110. The column spacer 2231 may be disposed on the display area DA of the first substrate 2210 and covered by a first alignment layer AL1.

The first alignment layer AL1 may be formed on the first substrate 2210 on which the column spacer 2231 is formed. The first alignment layer AL1 may include polyimide compound, polyamic acid compound, or a mixture thereof.

The blocking dam is formed in the peripheral area PA. The blocking dam overlaps the gap maintaining pattern 2214. The blocking dam is disposed in the same layer as the column spacer 2231. The blocking dam may include a material substantially the same as the material of the column spacer 2231. A height of the blocking dam may be substantially the same as a height of the column spacer 2231.

According to one embodiment, the blocking dam includes the first blocking dam 2232 and the second blocking dam 2233. The second blocking dam 2233 is disposed adjacent to the first blocking dam 2232. The second blocking dam 2233 may extend in a direction parallel to the first blocking dam 2232. A distance between the first blocking dam 2232 and the second blocking dam 2233 may be equal to or greater than about 2.5 mm and equal to or less than about 3.5 mm.

The sealing member 2240 is disposed between the first blocking dam 2232 and the second blocking dam 2233. The sealing member 2240 may be disposed in an area defined by the first blocking dam 2232 and the second blocking dam 2233. The sealing member 2240 may attach the first substrate 2210 to the second substrate 2110. The sealing member 2240 is disposed between the first blocking dam 2232 and the second blocking dam 2233 so that a width of the sealing member 2240 may be uniformly formed. Accordingly, the difference between the gap of the first and second substrates 2210 and 2110 in the display area DA and the gap of the first and second substrates 2210 and 2110 in the peripheral area PA may be decreased. A stain that may be formed due to the difference between the gap of the first and second substrates 2210 and 2110 in the display area DA and the gap of the first and second substrates 2210 and 2110 in the peripheral area PA may be reduced.

In addition, the blocking dam is formed in a uniform height so that a seal spacer may be omitted. Thus, the manufacturing cost of the display apparatus may be decreased.

The method of manufacturing the second substrate 2110 of the present exemplary embodiment is substantially the same as the method of manufacturing the second substrate of the display apparatus of the previous exemplary embodiment explained referring to FIGS. 1 to 11. Thus, any repetitive explanation concerning the method of manufacturing the second substrate 2110 will be omitted.

According to the present exemplary embodiment, the display apparatus includes the first blocking dam and the second blocking dam, and the sealing member is disposed between the first blocking dam and the second blocking dam. The sealing member is disposed between the first blocking dam and the second blocking dam so that a width of the sealing member may be uniformly formed. Accordingly, the difference between the gap of the substrates in the display area and the gap of the substrates in the peripheral area may be decreased. A stain that may be formed due to the difference between the gap of the substrates in the display area and the gap of the substrates in the peripheral area may be reduced.

In addition, the blocking dam is formed in a uniform height so that a seal spacer may be omitted. Thus, the manufacturing cost of the display apparatus may be decreased.

In addition, the display apparatus includes a gap maintaining pattern overlapping the first blocking dam and the second blocking dam. The gap maintaining pattern supports the area where the first blocking dam and the second blocking dam are formed so that the gap of the substrates may be uniformly formed in the display area and the peripheral area.

The foregoing is illustrative of the present disclosure and is not to be construed as limiting thereof. Although a few exemplary embodiments of the present disclosure have been described, those skilled in the art will readily appreciate that many modifications are possible in the exemplary embodiments without materially departing from the novel teachings and advantages of the present disclosure. Accordingly, such modifications are intended to be included within the scope of the present disclosure. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific exemplary embodiments disclosed, and that modifications to the disclosed exemplary embodiments, as well as other exemplary embodiments, are intended to be included within the scope of the present disclosure.

What is claimed is:

1. A display apparatus comprising:
   a first substrate comprising a display area and a peripheral area surrounding the display area;
   a color filter disposed in the display area;
   a gap maintaining pattern disposed in the peripheral area in a same layer as the color filter;
   a column spacer disposed on the color filter; and
   a blocking dam disposed in a same layer as the column spacer and overlapping the gap maintaining pattern;
   a second substrate facing the first substrate; and
   a liquid crystal layer disposed between the first substrate and the second substrate,
   wherein the blocking dam makes contact with the second substrate, and
   wherein the blocking dam comprises:
   a first blocking dam; and
   a second blocking dam adjacent to the first blocking dam and extending in a direction parallel to the first blocking dam.

2. The display apparatus of claim 1, further comprising a sealing member disposed between the first blocking dam and the second blocking dam.

3. The display apparatus of claim 2, wherein a distance between the first blocking dam and the second blocking dam is equal to or greater than about 2.5 mm and equal to or less than about 3.5 mm.

4. The display apparatus of claim 1, wherein the color filter comprises:
   a first color filter including a red material;
   a second color filter adjacent to the first color filter and including a green material; and
   a third color filter adjacent to the second color filter and including a blue material.

5. The display apparatus of claim 4, wherein the gap maintaining pattern includes a material substantially the same as the material of the first color filter.

6. The display apparatus of claim 5, wherein a height of the gap maintaining pattern is equal to or greater than about 1.5 um and equal to or less than about 1.8 um.

7. The display apparatus of claim 4, wherein the gap maintaining pattern includes a material substantially the same as the material of the second color filter.

8. The display apparatus of claim 7, wherein a height of the gap maintaining pattern is equal to or greater than about 1.5 um and equal to or less than about 1.8 um.

9. The display apparatus of claim 4, wherein the gap maintaining pattern includes a material substantially the same as the material of the third color filter.

10. The display apparatus of claim 9, wherein a height of the gap maintaining pattern is equal to or greater than about 1.7 um and equal to or less than about 2.3 um.

11. The display apparatus of claim 1, further comprising:
    a gate electrode disposed on the second substrate;
    a source electrode overlapping the gate electrode;
    a drain electrode overlapping the gate electrode and spaced apart from the source electrode; and
    a pixel electrode electrically connected to the drain electrode.

12. The display apparatus of claim 1, further comprising an overcoating layer disposed between the color filter and the column spacer.

* * * * *